United States Patent Office 3,743,515
Patented July 3, 1973

3,743,515
PREPARATION OF BLUE CHEESE FROM SOYBEAN MILK
Erik Lundstedt, South Chatham, Mass., and Frank Yau-Yee Lo, Kwun Tong, Hong Kong, assignors to The Hong Kong Soya Bean Products Co., Ltd., Kwun Tong, Kowloon, Hong Kong
No Drawing. Filed Dec. 1, 1970, Ser. No. 94,200
Int. Cl. A23c 19/02
U.S. Cl. 99—116                     6 Claims

ABSTRACT OF THE DISCLOSURE

A blue cheese with the same flavor, taste, and blue veins as Roquefort cheese, is made from a soya bean curd which is prepared from soya bean milk fortified with butter fat and non-fat milk solids, by inoculation with *penicillium roqueforti* and preferably also *Streptococcus diacetilactis*. Mold ripening only requires a two week period for full flavor development.

---

This invention relates to cheese and more specifically to a novel blue cheese made from soya bean milk.

The method generally employed for the manufacture of blue cheese from cow's milk consists of forming a curd by means of suitable agents capable of promoting coagulation, for instance rennet, separating the curd from the whey, adding the desired culture and letting the cheese ripen and packaging. The traditional Roquefort cheese, which has been made in France for about 2000 years, differs from blue cheese because it is made from ewe's milk. Only in the last century the production of a blue cheese from cow's milk has been carried out in France under the name Bleu and more recently in other countries.

The process for the preparation of Roquefort cheese is accompanied by many drawbacks. Under ordinary conditions, it takes a minimum of three months to cure and develop sufficient mold growth, flavor and body at a temperature of 50°–55° F. and usually an additional period of time of two or three months is necessary at a temperature usually lower than 40° F., for full flavor development.

Several attempts have been made for the purpose of eliminating or reducing the drawbacks accompanying the production of Roquefort cheese. U.S. Pat. 770,030, issued in 1904, describes a process in which ewe's milk is sown before the admixture of a curdling agent rather than thereafter. Another feature of the process of this patent consists of grinding the moldy bread with slightly alkaline water for the purpose of extracting the fatty materials. It is alleged in this patent that the process gives more uniform distribution of the spores and that the moldly bread, free from fat, does not float to the surface but mixes with the milk in a few seconds. In a second step, rennet is added, curding allowed to occur and the mass is finally placed in suitable molds. Manifestly the process of this patent, although apparently successful in giving better distribution of the spores, still requires the use of ewe's milk and the period of time required for a full flavor development is still between three and six months.

Kondrup, McNeil, Williamson and Hedrick in Manufactured Milk Products Journal, October 1964, reported the preparation of an acceptable blue cheese curd in a pilot plant run, by curing for only ten days in open trays or vats.

Some success in shortening the time for producing dried cheese of the type of grated cheeese has been reported in U.S. Pat. 2,965,492. According to this patent, a casein source, which may be whole milk, skim milk, dried milk or nonfat dry milk solids, is pasteurized, preferably mixed with a fat, inoculated with the desired culture and after fermentation, the product is spray-dried. The preparation of a dried cheese product with the flavor of Roquefort cheese is described from condensed skim milk by inoculation with a lactic acid starter, addition of butter oil, homogenization and incubation with *Pencillium roqueforti*. Manifestly, the product, after drying, is a cheese product with about 3% moisture content and does not resemble Roquefort cheese in texture. Moreover, apart from the flavor, the dried cheese product does not contain the characteristic blue veins of Blue cheese because drying serves the purpose of stopping the mold formation.

U.S. Pat. 3,365,303 describes a process according to which a blue cheese mold is added to milk prior to curd formation, the curd is divided into small pieces and is maintained in a divided condition until the cheese is fully ripened. It is there claimed that the process of preparation is substantially shortened.

The foregoing brief summary will be sufficient to demonstrate that no blue cheese has been made from any milk other than ewe's milk and cow's milk and the process of preparation has been necessarily time-consuming.

One object of this invention is to prepare a blue cheese from soya bean milk which reproduces closely the flavor of the traditional Blue cheese and which exhibits the same soft body and texture and good spreadability.

A further object is to prepared a blue cheese which may be prepared in much less time than the traditional Blue cheese, about 15 days total curing time.

Another object is to provide a blue cheese which may be preserved at normal refrigeration temperature for a long period of time and which, in contrast with Roquefort cheese, may even be kept in the frozen state without the loss of texture and body and with no deterioration of flavor and taste.

Another object is to provide a blue veined cheese which may be utilized in combination with oil, vinegar and other seasoning to make dressings or which may be mixed with other cheeses, for instance cold pack cheese dips.

The starting material, in accordance with this invention, is the soya bean curd described in our application Ser. No. 94,205 filed simultaneously herewith and entitled "A Heat-Stable Curd From Soya Bean Milk and Process of Manufacture Thereof." Although the subject matter of that application is incorporated herein by reference and a detailed description of the manner of preparation of the curd is unnecessary, it seems advantageous to summarize that the curd there described is a meltable curd, capable of being hot packed. The curd is prepared from soya bean milk of 1–10% solid content, preferably 6%, with about 1–10%, usually 2% of an edible fat and preferably 0.2–2.5% skim milk solids. The mixture is pasteurized at a temperature of about 185°–200° F. After homogenization, the milk is allowed to coagulate by addition of suitable curdling agents and the material heated to about 140°–170° F., and the curd is then drained until the water content is 60–80%.

Calcium chloride is a satisfactory curdling agent for the soya bean milk at a pH of 5.3–5.4, but occasionally contamination of the calcium chloride curd with foreign molds and particularly Bacterium linens and various Pseudomonas occurs, if the water available is contaminated with these bacteria. For this reason, a lactic acid curd, at pH 4.8, is preferably used. For the purpose of preventing the contamination by foreign bacteria, the loose curd containing 70–75% of moisture, is placed in stainless steel trays in the amount of about 15 pounds per each tray. The trays are about 20 inches long, 12 inches wide and the height is about 3⅞ inches.

For the purpose of preparing a cheese with the flavor, odor and characteristic blue veins of Roquefort cheese, the fat added to soya bean milk prior to curd formation is butter fat because the flavor and taste are the result of the action of the mold on the butter fat. The viability of the culture of Penicillium roqueforti is also essential because a mold powder of inferior quality considerably affects the flavor, taste and appearance of the cheese. Spores isolated from a high grade Roquefort cheese and inoculated in bread or in a liquid substrate are satisfactory.

The viability and purity of the culture may be tested preferably by inoculating the powder in a liquid medium consisting of 20 grams of malt extract, 10 grams of Yeastrel, 6 grams of maltose, 6 grams of dextrose, 1 gram of ammonium chloride, 1 gram of Bactopeptone, 1 gram of potassium dihydrogen phosphate in one liter of water. After adjusting the pH to 4.8, for instance with a 10% tartaric acid solution, an aliquot of about 200 cubic centimeters is placed in a 400 cubic centimeter Erlenmeyer flask, sterilized at ten pound pressure for 15 minutes and cooled to 75° F. When a small amount of mold powder is distributed in this medium, a ring around the edge of the liquid touching the glass is formed within four days, if the mold is of satisfactory quality.

We have now found that the heat-stable and meltable soya bean curd from soya bean milk of 6% solid content, 2% butter fat and 1.5% of non-fat dry milk solids, prepared as described in our copending application, is an excellent medium for mold ripening and specifically for ripening with a culture of Penicillium roqueforti. A mold culture from French Roquefort cheese is inoculated on squares of sterilized bread. After the bread is completely covered with mold, it is dried, ground and the mold powder sprinkled on the surface of the curd in the amount of about 10 grams per 100 pounds of curd.

According to a preferred embodiment of the invention, a citrated whey culture of Streptococcus diacetilactis is sprayed over the soya bean curd, for the purpose of enhancing the growth of the mold and increasing the ability of the mold to break down the fat.

After the curd is inoculated with the mold and sprayed with the citrated whey culture, the trays are placed in Pliofilm bags which are allowed to hang down from the trays for a section of about four inches. By this arrangement, air contamination is prevented and the water is allowed to evaporate until the moisture content is about 95%. The trays are then placed on pipe racks and left there for five days until the curd is covered with green mold. The curd is then turned over, the salt content adjusted to about 4% and the trays left on the rack for an additional period of two days. The temperature during this first curing stage is 50°–55° F. Finally the curd is placed in Pliofilm bags and transferred to the cooler room, where it is allowed to stand at a temperature below 40° F., preferably 26° F., for an additional period of seven days. The curing room is advantageously cooled by recirculation of air and the room is preferably kept dry.

The cheese obtained after a two-week curing time, has the appearance, texture and spreadability of the traditional Blue cheese. The product can be stored at 10° F. for about one year. The product consists of about 75% of water, about 15.16% soya bean solids, about 7.6% of butter fat and about 2.18% of non-fat milk solids.

The ripened cheese can either be cold packed or hot packed or it can be hot packed in a blend with the soya bean curd described in our patent application filed simultaneously herewith.

We claim:
1. A cheese with the flavor, structure, taste and characteristic blue veins of Roquefort cheese, consisting essentially of about 75% of water, about 15.16% of soya beans solids, about 7.6% of butter fat, and 2.18% of non-fat milk solids.
2. A food product in the form of a spread or dip comprising the cheese of claim 1 and at least one other cheese.
3. A food product in the form of a dressing comprising the cheese of claim 1, oil and vinegar.
4. The method of preparing a cheese according to claim 1 from soya bean milk which comprises forming a mixture by adding to soya bean milk of 1–10% solid content, 1–10% butterfat and .2–2.5% of skim milk solids, pasteurizing at 185°–200° F., coagulating the mixture, heating to about 140–170° F. and draining the curd until the water content is 60–80%, whereby soya bean base curd is obtained, inoculating said soya bean base curd with a viable culture of Penicillium roqueforti and a viable culture of Streptococcus diacetilactis, and allowing ripening to occur.
5. The method according to claim 4 wherein the ripening step is allowed to proceed for seven days at 50°–55° F. and for seven days at a temperature lower than 40° F.
6. The method according to claim 5 wherein the temperature in the second ripening step is 26° F.

References Cited
UNITED STATES PATENTS

| | | | |
|---|---|---|---|
| 3,365,303 | 1/1968 | Hedrick et al. | 99—116 |
| 3,048,490 | 8/1965 | Lundstedt | 99—116 |
| 3,189,464 | 6/1965 | Heinemann | 99—116 |
| 1,082,118 | 12/1913 | Gossel | 99—64 |
| 3,100,153 | 8/1963 | Knight | 99—116 |

FOREIGN PATENTS

| | | | |
|---|---|---|---|
| 30,275 | 1910 | Great Britain | 99—64 |
| 402,948 | 1933 | Great Britain | 99—64 |

OTHER REFERENCES

Hang et al.: Preparation of Soybean Cheese Using Lactic Starter Organisms, Food Technology, vol. 21, July 1967 (pp. 1033–1038).

Kosikowski, F.: Cheese and Fermented Milk Foods, published by the author, Cornell University, New York, 1966 (pp. 19, 20 and 268–271).

DAVID M. NAFF, Primary Examiner

U.S. Cl. X.R.

99—64, 117